US012729950B2

(12) United States Patent
Petry et al.

(10) Patent No.: US 12,729,950 B2
(45) Date of Patent: Sep. 8, 2026

(54) DOUBLE-MIRROR SHEAR INTERFEROMETER

(71) Applicant: HOCHSCHULE TRIER, Trier (DE)

(72) Inventors: Christopher Petry, Trier Zewen (DE); Michael Schuth, Riol (DE)

(73) Assignee: HOCHSCHULE TRIER, Trier (DE)

( * ) Notice: Subject to any disclaimer, the term of this patent is extended or adjusted under 35 U.S.C. 154(b) by 236 days.

(21) Appl. No.: 18/698,422

(22) PCT Filed: Sep. 29, 2022

(86) PCT No.: PCT/EP2022/077085
§ 371 (c)(1),
(2) Date: Apr. 4, 2024

(87) PCT Pub. No.: WO2023/057294
PCT Pub. Date: Apr. 13, 2023

(65) Prior Publication Data
US 2024/0418499 A1 Dec. 19, 2024

(30) Foreign Application Priority Data
Oct. 5, 2021 (DE) ..................... 10 2021 125 813.8

(51) Int. Cl.
*G01B 9/02098* (2022.01)
*G01B 9/02001* (2022.01)

(52) U.S. Cl.
CPC ...... *G01B 9/02098* (2013.01); *G01B 9/02011* (2013.01)

(58) Field of Classification Search
CPC .......................... G01B 9/02098; G01B 11/162
See application file for complete search history.

(56) References Cited

U.S. PATENT DOCUMENTS 6,606,160 B1 8/2003 Hung
2016/0265900 A1* 9/2016 Yang .................... G01B 11/162
(Continued)

FOREIGN PATENT DOCUMENTS

DE 4231578 C2 6/1995
EP 0 189 482 A1 8/1986
(Continued)

OTHER PUBLICATIONS

Petry et al.; "Spatial Phase Shift Shearography for Enhanced NDT;" International Symposium on Structural Health Monitoring and Nondestructive Testing; 2018; Saarbruecken, Germany; pp. 1-10.
(Continued)

*Primary Examiner* — Michael A Lyons
(74) *Attorney, Agent, or Firm* — Oliff PLC

(57) ABSTRACT

A measuring arrangement is provided for non-destructive interferometric measurement of an object surface. Light reflected from the surface enters the measuring arrangement as an incoming beam and passes through a diaphragm having an aperture, causing diffraction. The diffracted beam is directed to a mirror arrangement having two mirrors that split and deflect the beam into two partial beams. One of the mirrors is rotatable relative to the other. The partial beams are directed through a camera lens and combined at a camera to form an interference pattern for surface measurement. The camera includes an image sensor having a local sampling frequency. The diffraction produced by the diaphragm limits the spatial frequency of the interference pattern to a value that does not exceed a maximum local sampling frequency of the image sensor of the camera.

20 Claims, 1 Drawing Sheet

(56) References Cited

U.S. PATENT DOCUMENTS

| | | | | |
|---|---|---|---|---|
| 2020/0049493 | A1* | 2/2020 | Heideman | G02B 5/1814 |
| 2022/0049952 | A1* | 2/2022 | Schuth | G01B 11/2441 |
| 2022/0065617 | A1* | 3/2022 | Goodwin | G01B 11/162 |

FOREIGN PATENT DOCUMENTS

| | | | |
|---|---|---|---|
| JP | S63-009802 | A | 1/1988 |
| WO | 2015/065999 | A1 | 5/2015 |
| WO | 2018/215114 | A1 | 11/2018 |
| WO | 2020/164667 | A1 | 8/2020 |

OTHER PUBLICATIONS

Francis et al.; "Shearography technology and applications: a review;" Meas. Sci. Technol.; 2010; pp. 1-29; vol. 21, No. 10, pp. 102001.

Jan. 2, 2023 Search Report issued in International Patent Application No. PCT/EP2022/077085.

Apr. 9, 2024 International Preliminary Report on Patentability issued in International Patent Application No. PCT/EP2022/077085.

* cited by examiner

DOUBLE-MIRROR SHEAR INTERFEROMETER

BACKGROUND

The present invention relates to a measuring arrangement for non-destructive measurement of the surface of an object by means of interferometric measuring methods. The device comprises a diaphragm, a mirror arrangement and a camera.

The non-destructive measurement of an object's surface using interferometric measurement methods is known in principle and has established itself as a reliable method. For example, interferometers are used for this purpose. Interferometers based on the principle of shearography are also known.

Shearography is also a non-destructive laser testing method for non-contact and highly sensitive defect detection of surfaces. It is particularly suitable for measuring modern lightweight materials made from fiber-reinforced plastics. Shearography plays a central role in quality assurance in the aerospace industry, and increasingly also in the automotive industry, where the reduction in energy consumption and the associated use of resources is trendsetting.

Modern shearography measuring devices work with freely adjustable "shear". This is a decisive parameter for setting the sensitivity according to the measurement task. In addition, a so-called phase shifting method is used today for typical data processing for qualitative and quantifiable results in shearographic component analysis.

A measuring arrangement based on the principle of shearography and spatial phase shifting is described in WO 2020164667 A1, in which a Mach-Zehnder interferometer is used. Laser light, which is reflected by an illuminated measurement object, hits a first beam splitter and is split into two parts. Each part is directed onto a separate mirror and reflected there. One mirror is tilted by an angle β from the 45° position, which creates the desired "shear" required for shearography. The two parts then each pass through one diaphragm, whereby one of the diaphragms is displaced from the optical center axis. The two parts are then merged again in a second beam splitter, resulting in the desired interferometry. This is imaged in the camera, and thus the shearographic measurement can be carried out. However, the construction of such measuring systems is complex and expensive.

Other well-known shearographic measuring devices are also very sensitive to environmental influences and are difficult to use in industrial applications. In particular, temperature fluctuations, vibrations or disturbing ambient light repeatedly lead to disturbances that prevent measurement or distort the measurement results to such an extent that they are unusable. In order to ensure the usability of the systems, either slow-working measuring devices are used, which, however, make multiple measurements necessary, or a high stabilization effort is made, e.g. by using vibration-insulated measuring tables or special foundations for measuring rooms to compensate for vibrations. In many cases, the use of powerful light sources is also necessary for the measurement, e.g. the use of powerful lasers, which entails high requirements for increased laser safety classes and high costs for powerful lasers. In addition, the measurement systems are not only expensive due to the measures taken, but are also inflexible, have limited mobility, require a large setup and are time-consuming to use. Furthermore, the systems are often user-unfriendly and can only be used to a limited extent in industrial environments.

The measurement setups and systems described in DE 4231578 C2, U.S. Pat. No. 6,606,160 B1, JP63009802A and EP 0189482 A1 show optical sensor setups for shearography in which the necessary phase information is obtained over time during the measurement. They all have at least one mirror that has to be moved laterally during the measurement or an optically transmitted element that has to be controlled in terms of its optical refractive index during the measurement. In addition to the high costs of these special, high-precision electromechanical or optoelectrical components, they greatly reduce measurement robustness due to the continuous control required to obtain phase information for each measurement.

BRIEF SUMMARY

The task is therefore to propose an improved measuring arrangement that overcomes the disadvantages of the state of the art and is user-friendly and costeffective.

The problem is solved by a measuring arrangement and a method described herein.

In one aspect, the present invention relates to a measurement arrangement for non-destructive measurement of the surface of a measurement object or object by means of interferometric measurement methods, wherein light impinges the measurement arrangement as a light beam reflected from the surface. The measuring arrangement according to the invention comprises a diaphragm with an aperture, a mirror arrangement, a camera lens and a camera. The mirror arrangement has two mirrors, each with a mirror surface, one of which is a partially transparent partial mirror and one of which is preferably a full mirror, which is arranged behind the partially transparent partial mirror in the direction of radiation.

The incoming light beam passes through the diaphragm and is diffracted before it hits the mirror arrangement, where it is split into two partial beams and deflected before reaching the camera. The partial beams of the light beam interfere with each other in the camera. The light beam passes the camera lens in front of the camera in the direction of the beam. In the arrangement, one of the mirrors of the mirror arrangement is rotatable relative to the other mirror in such a manner that the two mirrors enclose a non-zero angle β in a plane normal to the mirror surfaces.

In the measuring arrangement according to the invention, the camera has a camera chip with a local sampling frequency. The local sampling frequency of the camera chip is the distance between the photosensitive pixels of the chip.

The pixels are preferably square. Preferably, a maximum of light with a spatial frequency of one oscillation per 2 pixels of the camera can be detected. The physical unit of the local sampling frequency is [1/m].

The use of a diaphragm is necessary to perform spatial phase shifting. According to the invention, the diaphragm is designed in such a manner that the reflected light beam is diffracted in a desired manner when passing through the diaphragm. The light beam is diffracted in such a way that its spatial frequency $f_{light}$ (i.e. that of the light) corresponds at most to the maximum local sampling frequency of the camera chip $f_{max\ camera}$ during detection on the camera chip. The term spatial frequency of an optical signal refers to the sequence of bright and dark areas over a spatial axis; it also has the unit [1/m]. The diaphragm thus generates a light diffraction in such a manner that at most one bright interference peak or one dark interference valley of the light hitting the camera is imaged on a camera pixel.

Therefore, preferably the following applies:

$$f_{light} \leq f_{max\ camera} \text{ or } f_{light} \leq 1/(2^* b_{pixel}), \text{ with } b_{pixel} = \text{pixel width of the camera chip}$$

In a further aspect, the invention relates to a measuring system with such a measuring arrangement and an evaluation unit which receives and processes measuring signals generated by the camera, so that a measured variable characteristic of the surface of the object to be measured is determined from the measuring signals of the interfering partial beams, which allows a statement to be made about properties of the surface. The properties of the surface include the surface texture, quality, deformations, distortions and any defects or the uniformity of the surface. The quality of surface connections can also be determined.

Other aspects of the invention relate to a corresponding method and a computer program product comprising a program code for performing the steps of the method when the program code is executed on a computer, and a storage medium on which is stored a computer program which, when executed on a computer, causes execution of the method described herein.

Preferred embodiments of the invention are described in the dependent claims. It is to be understood that the features mentioned above and those to be explained below can be used not only in the combination indicated in each case, but also in other combinations or on a stand-alone basis, without departing from the scope of the present invention. In particular, the method and the computer program product can be implemented according to the embodiments described for the measuring arrangement in the dependent claims.

In the context of the invention, it was found that the optical path of the light from entering the measuring device to the camera is very long in measuring devices based on the Mach-Zehnder setup, which comprise two beam splitters, and that this causes shading in the camera image. This means that large measurement objects can only be captured with difficulty and in several measurement steps, as the measurement area at a typical measurement distance of approx. 400 mm only corresponds to the size of a DIN A4 page. The optical path of the light is also only slightly shorter for devices with a Michelson set-up, so that the same problems arise.

In addition, unwanted light reflections and absorptions are caused when the light passes through the two beam splitters, which leads to a reduction in the laser measurement light. Strong laser sources must therefore be used to illuminate the object, which increases the costs for the laser and generates further costs for an increased laser safety class. In addition, the quality of the results is reduced by the reflections.

As part of the invention, it was recognized that the shifting of two light beams required for shearography can also be generated in other ways. To this end, it was determined in investigations that the necessary shear can be generated if the light beam reflected by the measurement object first passes through a diaphragm and then directly impinges a mirror arrangement in which the light beam is split into two partial beams, whereby tilting or twisting one of the mirrors causes the partial beams to diverge so that they can interfere in the camera. Direct here means that no component is interposed that diffracts, splits or reflects the light beam reflected by the measurement object.

The mirror arrangement is therefore designed in such a manner that the light beam impinging on the mirror arrangement is split at the partial mirror into a first partial beam and a second partial beam, whereby the first partial beam is reflected and directed towards the camera. The second partial beam passes the partial mirror and is reflected by the full mirror and directed towards the camera. The second light beam passes the partial mirror again, but this time in a different direction and also without deflection.

The measuring arrangement according to the invention has the advantage that a separate beam splitter can be dispensed with and that the optical path within the measuring arrangement can be shortened. The shortened light path leads to lower shadowing effects during the measurement, so that a twice as large measurement area can be measured compared to a Mach-Zehnder setup. As the reflection and absorption losses are minimal, in particular significantly lower than with the known setups, low-powered lasers with the lowest laser safety class can be used, which are inexpensive and also eliminate the high safety and protection requirements for the laser.

In contrast to the prior art, phase information is generated according to the invention using the principle of “spatial phase shifting”. In addition, (specially adjusted and specially arranged) standard components can be used. The core advantage is that there are no moving or continuously controlled components in the optical setup during the measurement. The components that do not move during the measurement greatly increase the robustness of the measurement (by a factor of approx. 10), which means that this measurement and measurement method can also be used in harsh industrial environments for the first time.

According to the invention, such an arrangement therefore also serves as the basis for a double-mirror shear interferometer, in particular a miniature double-mirror shear interferometer, which can be set up in a very small space and provides very good and reliable measurement results. The arrangement can be realized with just a few components and is therefore inexpensive and also very robust, even against environmental influences. The installation and adjustment effort are also reduced. The system is mobile and can be easily deployed at the desired measuring locations.

In a preferred embodiment of the measuring device according to the invention, one of the mirrors of the mirror arrangement is aligned in such a manner that the light beam impinging on the mirror arrangement is reflected by an angle $\alpha$ in the direction of the camera and hits the camera. The angle $\alpha$ is preferably at least 70°, very preferably at least 80° and particularly preferably 90°. Furthermore, the angle $\alpha$ is at most 110°, preferably at most 100°. Ideally, the angle $\alpha$ is 90°. However, acceptable measurement results that are useful in practice can still be achieved in an angle range of +20°.

In a further preferred embodiment, the mirrors of the mirror arrangement are designed in such a manner that the mirror surfaces on which reflection or partial reflection takes place are at a distance from each other. The distance is different from 0 so that the two partial beams formed in the mirror arrangement are offset. The distance x between the two mirror surfaces is defined as the distance between the mirror surfaces directed towards the incoming light beam orthogonal to the mirror surface. The mirror surface is therefore considered to be the surface of the mirror on which a reflection or partial reflection of the incoming light beam occurs. In a preferred embodiment, this distance x of the mirror surfaces is ≥70% of the width of the aperture of the diaphragm used. In addition, practical investigations have shown that the distance x should not be greater than seven times the aperture of the diaphragm.

Therefore, preferably the following applies:

$$b_{max\ diaphragm} * \cos(45°) \leq x \leq 10 * b_{max\ diaphragm} * \cos(45°)$$

Under these conditions, a virtual double slit is visible from the camera's direction of view, which provides a sufficiently good spatial frequency for spatial phase shifting or for spatial frequency sampling for the purpose of light phase determination.

In another equally preferred embodiment of the measuring arrangement according to the invention, the angle by which one mirror of the mirror arrangement is rotated relative to the other mirror of the mirror arrangement is in a range between 0.001° and 20°. Preferably, the range of this angle β is between 0.01° and 10°, more preferably the angle β is in a range between 0.1° and 5°. In practical use, very robust and meaningful measurements have been obtained when the angle β lies in a range between 0.2° and 1°. A range for the angle β between 0.5° and 1° has established itself as the optimum working range for many measurements to determine the surface characteristics of objects.

In principle, it does not matter which of the mirrors in the mirror arrangement is rotatable and which is designed as a fixed mirror. In practical applications, however, it has been shown that it is advantageous if the full mirror of the mirror arrangement can be rotated relative to the partial mirror. The partial mirror is therefore fixed, while the full mirror can be rotated.

In a preferred embodiment of the measuring arrangement, the camera lens can be positioned in front of the diaphragm in the direction of the beam in order to generate good measurement results. Alternatively, it is possible for the camera object to be positioned between the mirror arrangement and the camera. In both cases, equally good measurement results are achieved. Depending on the application and design of the camera, there are therefore different ways of arranging the lens.

In an equally preferred embodiment of the measuring arrangement according to the invention, the diaphragm comprises a slit with a slit width b, the maximum slit width b being less than or equal to the product of the wavelength λ of the light beam, the focal length $f_{lens}$ of the camera lens and the maximum local sampling frequency of the camera chip $f_{max\ camera}$.

Therefore, the following preferably applies to the maximum gap width of the diaphragm:

$$b_{max\ diaphragm} \leq \lambda * f * f_{max\ Camera} \text{ or } b_{max\ diaphragm} \leq \lambda * f * 1/2\, b_{pixel}$$

In a further preferred embodiment of the measuring arrangement, the diaphragm comprises a circular aperture with a diameter d. This leads to a better spatial resolution of the camera image, i.e. to a higher lateral measuring accuracy. The maximum diameter d is preferably less than or equal to the product of 1.22 times the wavelength λ of the light beam, the focal length $f_{lens}$ of the camera lens and the maximum local sampling frequency of the camera chip $f_{max\ camera}$ $f_{max\ camera}$.

Therefore, the following preferably applies to the maximum circular diameter of the diaphragm:

$$d_{max\ diaphragm} \leq 1.22 * \lambda * f * f_{max\ camera} \text{ or } d_{max\ diaphragm} \leq 1.22 * \lambda * f * 1/2\, b_{pixel}$$

In a further preferred embodiment of the invention, the diaphragm of the measuring arrangement has an aperture which comprises a polarization filter and thus only transmits light or light components of the light beam with a specific polarization. This enables additional coding to be applied and individual wavefronts to be distinguished. Consequently, a simultaneous, additional phase evaluation is possible. Also preferred is a diaphragm with two, preferably orthogonally aligned apertures or slits, each of which has a polarization filter.

In another preferred embodiment of the invention, the diaphragm of the measuring arrangement has an aperture that has a frequency filter so that only certain wavelengths can pass through the diaphragm. This also allows additional coding to be applied, particularly in the case of multi-wavelength illumination, and makes it possible to distinguish individual wavefronts. Consequently, a simultaneous, additional phase evaluation is possible, for example for so-called inplane deformation measurements.

Preferably, the measuring arrangement can have several diaphragms that are designed differently and are, for example, a combination of the diaphragms described above.

In addition to the mirror arrangement with two mirrors, the measuring arrangement can preferably also include other mirrors. For example, a mirror arrangement could comprise two partial mirrors and one full mirror.

The camera of the measuring arrangement can preferably be a CCD camera, a polarization camera or a color camera. Other camera types are conceivable.

A preferred embodiment of the measurement arrangement is that the diaphragm is designed as a grating diaphragm. When using a grating diaphragm, more light can reach the camera chip, so that the exposure time is shortened compared to a measurement with a single-aperture diaphragm and the measurement is more robust overall. It is particularly preferable for the grating diaphragm to have certain aperture slit widths in two dimensions, with the slit widths preferably having the same dimensions. Of course, the slit widths can also be different in different dimensions.

Another preferred embodiment provides for the partial mirror to be polarized so that a first partial beam is reflected and an orthogonally polarized second partial beam is transmitted. The second partial beam is then reflected by the full mirror before it reaches the camera. The partial mirror is passed through again. As the light reflected by the full mirror has the "correct" polarization, it can pass through the mirror unhindered. A polarizing partial mirror can be used, for example, to prevent occasional multiple reflections between the two mirrors.

When using a polarized partial mirror, a depolarization element is preferably arranged between the mirror arrangement and the camera. The depolarization element ensures that the two polarized partial beams from the double-mirror arrangement are unpolarized again, i.e. the polarization is cancelled so that the partial beams can interfere with each other.

Another preferred embodiment of the measuring arrangement has a partial mirror with a reflectance that is different from the transmittance. The transmittance is particularly preferably greater than the reflectance. In principle, reflectance and transmittance can vary between 1% and 99%, whereby in practice a reflectance of 40% and a transmittance of 60% (±10% in each case) are considered suitable. It is also possible for reflectance and transmittance to be the same.

In a preferred embodiment, the measuring arrangement has an evaluation unit that receives and processes the measurement signals generated by the camera. In this way, the measurement signals of the interfering partial beams are used to determine a measurement variable that is characteristic of the surface of the object to be measured. Thereby, a statement can be made about the properties of the surface.

In another preferred embodiment, the measuring arrangement can comprise a housing with an opening to allow the light beam to pass through. The housing preferably accommodates the elements of the measuring arrangement, in particular the diaphragm, mirror arrangement, camera lens and camera. In this case, the diaphragm is preferably arranged behind the opening. The camera lens can preferably be arranged between the diaphragm and the opening, in the opening or in front of the opening.

By means of the described measuring arrangement and/or the system, which preferably also comprises an evaluation unit, a large number of measurements can be carried out in order to draw conclusions about the properties of an object and its surface. Such measurements include, for example, a roughness measurement, a flatness measurement, a surface shape gradient measurement and relative measurements such as relative thickness measurement, relative slope measurement and relative strain measurement. Deformation measurements with a predetermined excitation are also possible. This allows statements to be made about defects such as cracks, inhomogeneities, delaminations, foreign material inclusions and gas bubbles on or under the surface. Such measurements therefore represent a non-destructive test. Another measurement method is the vibration analysis. Here, the component is stressed by vibrating loads. The invention is described and explained in more detail below with reference to some selected embodiments in connection with the accompanying drawings.

DETAILED DESCRIPTION

Figure 1:
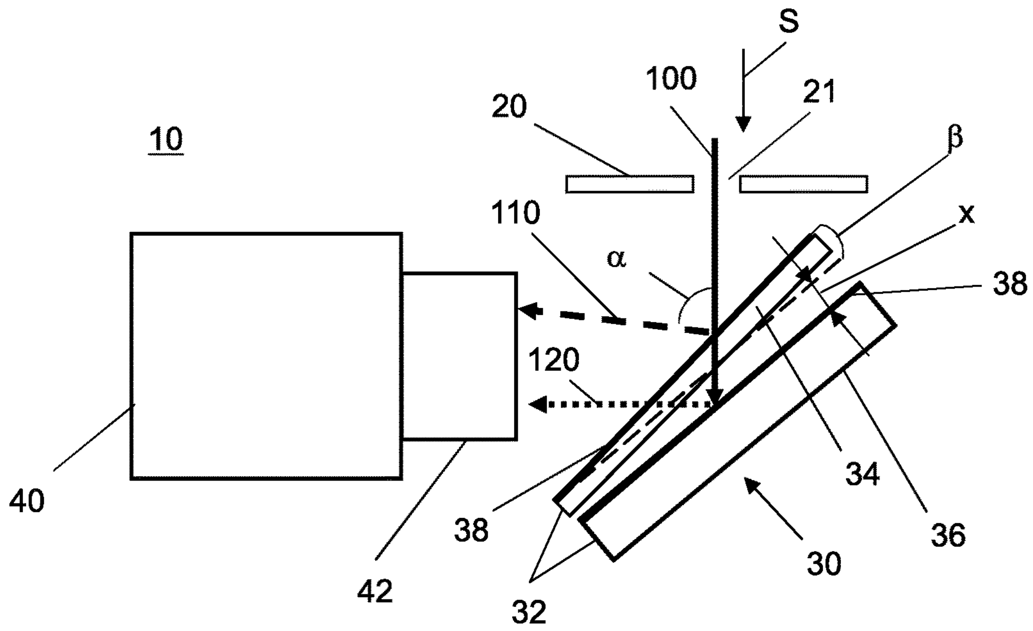
FIG. 1 a measuring arrangement according to the invention with a diaphragm and a mirror arrangement.

A measuring arrangement 10 according to the invention comprises a diaphragm 20 with an aperture 21, a mirror arrangement 30 with two mirrors 32, a camera 40 and a camera lens 42.

One mirror 32 of the mirror arrangement 30 is designed as a partially transparent partial mirror 34, while the second mirror 32 is a full mirror 36. The full mirror 36 is arranged behind the partial mirror 34 in the direction of radiation (arrow) S of the incident light beam 100. In the embodiment shown here, the partial mirror 34 is rotated by an angle β relative to the full mirror 36, so that the two mirrors 32 are no longer arranged in parallel. The two mirrors 32 are spaced apart from each other and have a distance x. The distance x is the distance between the mirror surfaces 38 of the mirrors 32 when the two mirrors 32 are arranged parallel to each other.

When a light beam 100 hits the measuring arrangement 10, it first passes the diaphragm 20 and is then directed straight onto the mirror arrangement 30. This is preferably done without interposing any other optical elements. The light beam 100 hits the mirror surface 38 of the partial mirror 34 and is partially reflected there into a first partial beam 110, which is deflected in the direction of the camera. The partial beam 110 passes through the camera lens 42 to the camera 40, where it strikes a camera chip not shown here.

A part of the light beam 100 is transmitted through the partial mirror 34 and then impinges the mirror surface 38 of the full mirror 36. This part of the light beam 100 is now reflected and reaches the camera 40 as the second partial beam 120. The two partial beams 110 and 120 interfere with each other in the camera 40, whereby the two partial beams do not strike the camera 40 parallel to each other. The carrier frequency required for the spatial phase shift is generated by the distance x between the two mirrors 32. This results in a lateral shift to the beam direction. By rotating one of the mirrors 32 and the distance between the two mirrors, the shear angle of the two mirror planes to each other is also changed at the same time. The adjustment for a measurement can therefore be made very sensitively and is variable or possible in small steps. Fine adjustment of the arrangement can be carried out easily.

The measuring arrangement shown in FIG. 1 provides for the partial mirror 34 to be rotated relative to the full mirror 36. In the embodiment shown here, the light beam 100 incident on the full mirror 36 is reflected by an angle α at the full mirror 36 and reaches the camera 40 as a second partial beam 120. In the example shown here, the angle α is equal or almost equal to 90°.

Alternatively and particularly preferably, the partial mirror 34 is fixed and the full mirror 36 can be rotated, so that the angle α between the light beam 100 incident on the partial mirror 34 and the reflected first light beam 110 is in the range between 7° and 110°, preferably 90°+2°, due to the suitable arrangement of the partial mirror 34.

Figure 2:
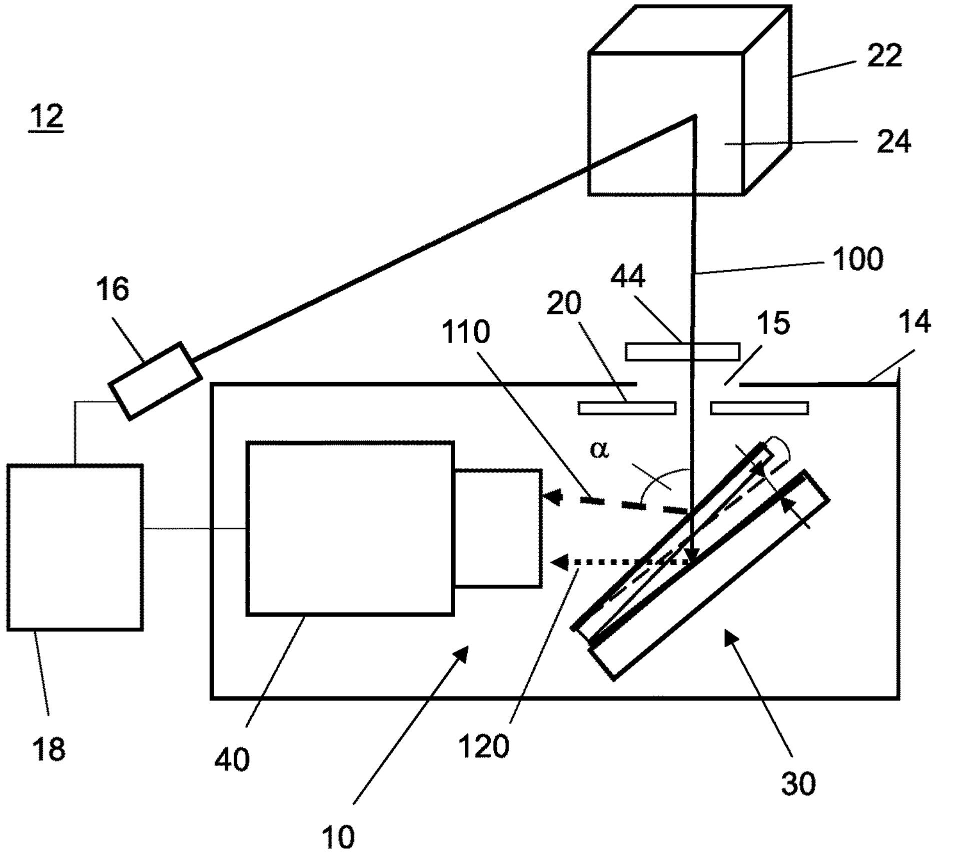
FIG. 2 a measuring system for measuring the surface of an object comprising a measuring arrangement, a light source and an evaluation and control unit.

FIG. 2 shows a measuring system 12 with the measuring arrangement 10 of FIG. 1, a housing 14 for the measuring arrangement 10, a light source in the form of a laser 16 and a control and evaluation unit 18, which on the one hand can control and regulate the laser 16 and on the other hand receives measuring signals from the camera 40 and processes them into measured variables characteristic of the surface of the object 22 to be measured.

A light beam generated by the laser 16 is directed onto a surface 24 of the object to be measured and reflected here in the direction of the measuring arrangement. The reflected light beam 100 enters the housing 14 through an opening 15 and first passes the diaphragm 20 of the measuring arrangement 10 before the light beam 100 hits the mirror arrangement 30. Here, the light beam 100 is split into a first partial beam 110 and a second partial beam 120 in the manner described above, whereby both partial beams do not hit the camera 40 parallel to each other and interfere with each other there. By rotating the two mirrors 32 relative to each other and by the offset caused by the distance x between the two mirrors 32, the necessary “shear” is generated, which is required for the shearographic evaluation.

The present measuring arrangement therefore has the advantage that it is very inexpensive and simple in design. Apart from the camera 40 with the camera lens 42, only a diaphragm and a double-mirror arrangement with a partially transparent partial mirror 34, for example a semi-transparent half mirror, and a full mirror 36 are required. Since one of the mirrors 32, for example, as shown here, the partial mirror 34, is tilted by an angle β relative to the full mirror 36, a shear is generated, which is necessary for shearography. In the present embodiment example, the partial mirror is therefore rotated out of the "45° position" in which the full mirror 36 is located. The two reflected components (first partial beam 110 and second partial beam 120 of the partial mirror 34 or full mirror 36) are merged on their way to the camera, but at the latest in the camera, so that the desired interference occurs. The resulting interference pattern is imaged in the camera so that a shearographic measurement can be carried out. The lateral offset (distance x) between the two mirrors creates a virtual double slit from the camera's point of view. As a result, the superposition of the two light components (first partial beam, second partial beam) contains an additional carrier frequency that is used for spatial phase shifting.

As only a few components are used, a very small and compact design is possible. The measuring arrangement as a whole is very robust and also mobile and can be used easily in many different locations.

FIG. 2 shows an optional filter 44, which is arranged in the beam path in front of the diaphragm 20. The filter 44 is an optical filter and can, for example, be a color filter or polarization filter. It can also optionally be positioned between the diaphragm 20 and the mirror arrangement 30 or between the mirror arrangement 30 and the camera 40. However, there must be no component between the diaphragm and the mirror arrangement that diffracts, splits or reflects the measuring light. The measurement light is the laser light reflected by the measurement object, which is interferometrically superimposed in the camera.

The invention has been comprehensively described and explained with reference to the drawings and description. The description and explanation are intended to be exemplary and not limiting. The invention is not limited to the disclosed embodiments. Other embodiments or variations will become apparent to those skilled in the art upon use of the present invention and upon detailed analysis of the drawings, the disclosure and the following claims.

In the claims, the words "comprising" and "with" do not exclude other elements or steps. The indefinite article "a" or "an" does not exclude a plurality. A single element or unit may fulfill the functions of several items recited in the claims. An element, a unit, a device, and a system may partially or completely be implemented by corresponding hardware and/or software. The mere fact that certain measures are recited in several different dependent claims does not indicate that a combination of these measures cannot be used to advantage.

Reference signs in the patent claims are not to be understood restrictively.

REFERENCE SIGNS

10 Measuring arrangement
12 Measuring system
14 Housing
15 Opening
16 Laser
18 Control and evaluation unit
20 Diaphragm
21 Aperture
22 Object
24 Surface
30 Mirror arrangement
32 Mirror
34 Partial mirror
36 Full mirror
38 Mirror surface
40 Camera
42 Camera lens
44 Filter
100 Light beam
110 First partial beam
120 Second partial beam
S Direction of the light beam
X Distance

The invention claimed is:

1. A measuring arrangement for non-destructive interferometric measurement of a surface of an object, wherein light reflected from the surface enters the measuring arrangement as an incident light beam, comprising a diaphragm with an aperture;

a mirror arrangement arranged downstream of the diaphragm in a beam direction of the incident light beam, the mirror arrangement comprising a partially transparent partial mirror, and a full mirror arranged behind the partial mirror in the beam direction;

a camera lens and a camera comprising a camera chip having a maximum local sampling frequency;

wherein the incident light beam passes through the diaphragm and is diffracted by the diaphragm before impinging on the mirror arrangement;

wherein the incident light beam is split at the mirror arrangement into a first partial beam reflected at the partial mirror and a second partial beam transmitted through the partial mirror and reflected at the full mirror, the first and second partial beams propagating toward the camera and interfering at the camera;

wherein one of the mirrors of the mirror arrangement is rotatable relative to the other mirror such that the mirrors enclose a non-zero angle β in a plane normal to the mirror surfaces;

wherein at least one of the mirrors is oriented such that the incident light beam is reflected toward the camera at an angle α of at least 70°;

wherein the mirror arrangement is configured such that the first and second partial beams are non-collinear when propagating toward the camera;

wherein mirror surfaces of the mirrors are spaced apart by a distance x, the distance x being greater than or equal to 70% of a width of the aperture of the diaphragm and less than seven times the width of the aperture; and wherein the diaphragm is dimensioned such that diffraction of the incident light beam at the diaphragm limits a spatial frequency of the light incident on the camera chip to at most the maximum local sampling frequency of the camera chip during detection.

2. The measuring arrangement according to claim 1, wherein the angle α is at least 80°.

3. The measuring arrangement according to claim 1, wherein the angle α is 90°.

4. The measuring arrangement according to claim 1, wherein the angle α is at most 110°.

5. The measuring arrangement according to claim 1, wherein the angle α is at most 100°.

6. The measuring arrangement according to claim 1, wherein the angle β lies in a range between 0.001° and 20°.

7. The measuring arrangement according to claim 1, wherein the angle β lies in a range between 0.01° and 10°.

8. The measuring arrangement according to claim 1, wherein the angle β lies in a range between 0.1° and 5°.

9. The measuring arrangement according to claim 1, wherein the angle β lies in a range between 0.2° and 1°.

10. The measuring arrangement according to claim 1, wherein the angle β lies in a range between 0.5° and 1°.

11. The measuring arrangement according to claim 1, wherein the full mirror of the mirror arrangement is rotatable relative to the partial mirror.

12. The measuring arrangement according to claim 1, wherein the camera lens is arranged in front of the diaphragm in the beam direction(S) or between the mirror arrangement and the camera.

13. The measuring arrangement according to claim 1, wherein the diaphragm comprises a slit with a slit width b, the maximum slit width b being less than or equal to the product of wavelength λ of the light beam, focal length of the camera lens and maximum local sampling frequency of the camera chip.

14. The measuring arrangement according to claim 1, wherein the diaphragm has a circular aperture with a diameter d, the maximum diameter d being less than or equal to the product of 1.22 times the wavelength λ of the light beam, focal length of the camera lens and maximum local sampling frequency of the camera chip.

15. The measuring arrangement to claim 1, wherein the diaphragm is a grating diaphragm or the diaphragm comprises a polarization filter or a frequency filter.

16. The measuring arrangement according to claim 1, wherein the partial mirror is designed to be polarizing, so that a first partial beam is reflected and an orthogonally polarized second partial beam is transmitted, the second partial beam being reflected at the full mirror before it reaches the camera.

17. The measuring arrangement according to claim 1, wherein the partial mirror has a reflectance which is different from the transmittance, the transmittance being greater than the reflectance.

18. The measuring arrangement according to claim 1, wherein a control and evaluation unit receives and processes measurement signals generated by the camera, so that a measurement variable characteristic of the surface of the object to be measured is determined from the measurement signals of the interfering partial beams, which measurement variable permits a statement to be made about properties of the surface.

19. A measuring system with a measuring arrangement according to claim 1 and with an evaluation unit which receives and processes measuring signals generated by the camera, so that a measured variable characteristic of the surface of the object to be measured is determined from the measuring signals of the interfering partial beams, which allows a statement to be made about properties of the surface.

20. A method for non-destructive interferometric measurement of a surface of an object, the method comprising:
- providing a measuring arrangement comprising:
  - a diaphragm having an aperture,
  - a mirror arrangement arranged downstream of the diaphragm in a beam direction and comprising a partially transparent partial mirror and a full mirror arranged behind the partial mirror in the beam direction,
  - a camera lens, and
  - a camera comprising a camera chip having a maximum local sampling frequency;
- illuminating the surface of the object with coherent light;
- receiving light reflected from the surface as an incident light beam and guiding the incident light beam through the diaphragm;
- diffracting the incident light beam at the diaphragm before the incident light beam impinges on the mirror arrangement;
- splitting the incident light beam at the mirror arrangement into
  - a first partial beam reflected at the partial mirror, and
  - a second partial beam transmitted through the partial mirror and reflected at the full mirror;
- directing the first and second partial beams toward the camera such that the first and second partial beams propagate non-collinearly toward the camera and interfere at the camera;
- rotating one of the mirrors of the mirror arrangement relative to the other mirror such that the mirrors enclose a non-zero angle β in a plane normal to mirror surfaces of the mirrors;
- reflecting the incident light beam toward the camera at an angle α of at least 70° at at least one of the mirrors;
- spacing mirror surfaces of the mirrors apart by a distance x, wherein the distance x is greater than or equal to 70% of a width of the aperture of the diaphragm and less than seven times the width of the aperture;
- dimensioning the diaphragm such that diffraction of the incident light beam at the diaphragm limits a spatial frequency of light incident on the camera chip to at most the maximum local sampling frequency of the camera chip during detection;
- recording, by the camera, an interferometric superposition of the first and second partial beams; and
- evaluating the recorded interferometric superposition to determine at least one measurement variable characteristic of the surface of the object.

* * * * *